(12) United States Patent  (10) Patent No.: US 7,260,667 B2
Mitsuishi  (45) Date of Patent: *Aug. 21, 2007

(54) DATA TRANSFER DEVICE, SEMICONDUCTOR INTEGRATED CIRCUIT, AND MICROCOMPUTER

(75) Inventor: Naoki Mitsuishi, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/475,937

(22) Filed: Jun. 28, 2006

(65) Prior Publication Data

US 2006/0248254 A1    Nov. 2, 2006

Related U.S. Application Data

(63) Continuation of application No. 10/705,902, filed on Nov. 13, 2003, now Pat. No. 7,093,055.

(30) Foreign Application Priority Data

Jan. 20, 2003    (JP)    ............................. 2003-010739

(51) Int. Cl.
    *G06F 13/00*    (2006.01)
(52) U.S. Cl. .................... 710/306; 710/308; 710/309
(58) Field of Classification Search ................ 710/306
    See application file for complete search history.

(56) References Cited

U.S. PATENT DOCUMENTS 5,828,856 A    10/1998    Bowes et al.
6,021,451 A    2/2000    Bell et al.
6,026,460 A    2/2000    David et al.
6,163,826 A    12/2000    Khan et al.
6,212,590 B1    4/2001    Melo et al.
6,237,057 B1    5/2001    Neal et al.
6,567,880 B1    5/2003    Olarig
6,742,074 B2    5/2004    Jeddeloh
6,889,283 B2    5/2005    Shah
6,907,489 B2    6/2005    Okazawa et al.

(Continued)

FOREIGN PATENT DOCUMENTS

JP    4-137954    9/1990

(Continued)

*Primary Examiner*—Glenn A. Auve
(74) *Attorney, Agent, or Firm*—Reed Smith LLP; Stanley P. Fisher, Esq.; Juan Carlos A. Marquez, Esq.

(57) ABSTRACT

It is aimed at improving the efficiency of data transfer processing and the concurrent data processing on a central processing unit. A data transfer device can independently request a bus access right and output an address to a first bus (IBUS) and a second bus (PBUS). It is possible to solve the state of competing for the bus access right between both buses. While the bus access right of one bus is granted for reading or writing, the bus access right of the other bus can be released. When the data transfer device releases the bus access right for the first bus, a central processing unit can process data. In response to one data transfer start request, the bus access right is requested for one bus and the other bus, There is not used a sequence of requesting the bus access right in response to different data transfer requests for respective buses. It is possible to simplify a handshake sequence of a data transfer request and its acknowledgment.

5 Claims, 8 Drawing Sheets

U.S. PATENT DOCUMENTS

| | | | |
|---|---|---|---|
| 7,093,055 B2 * | 8/2006 | Mitsuishi | 710/306 |
| 2005/0216646 A1 | 9/2005 | Kameda | |
| 2006/0248248 A1 * | 11/2006 | Mitsuishi | 710/107 |

FOREIGN PATENT DOCUMENTS

| | | |
|---|---|---|
| JP | 5-2557 | 6/1991 |
| JP | 2000-235560 | 2/1999 |

* cited by examiner

DATA TRANSFER DEVICE, SEMICONDUCTOR INTEGRATED CIRCUIT, AND MICROCOMPUTER

CROSS-REFERENCE TO RELATED APPLICATIONS

This application is a Continuation application of U.S. application Ser. No. 10/705,902 filed Nov. 13, 2003 now U.S. Pat. No. 7,093,055. Priority is claimed based on U.S. application Ser. No. 10/705,902 filed Nov. 13, 2003, which claims the priority of Japanese Patent Application 2003-010739 filed on Jan. 20, 2003, all of which is incorporated by reference.

BACKGROUND OF THE INVENTION

The present invention relates to a data transfer device. More specifically, the present invention relates to a semiconductor integrated circuit and a microcomputer containing the data transfer device, e.g., to a technology effectively used for a single-chip microcomputer having a high-speed external input/output interface circuit.

A single-chip microcomputer comprises functional blocks such as a central processing unit (CPU) as a main component, ROM (read-only memory) for storing programs, RAM (random access memory) for storing data, and an input/output circuit for data input and output. These functional blocks are formed on a single semiconductor substrate.

There is available a single-chip microcomputer that contains a direct memory access controller (DMAC) and is capable of data transfer independently of the CPU (see patent document 1). An interrupt request can activate the DMAC capable of repeat mode and block transfer mode. In a printer system, for example, the DMAC is suitable for controlling stepping motors, controlling printout data on a printer, and storing received data in memory. Such example is capable of transferring up to eight channels of data. Since the DMAC transfers data independently of the CPU but shares a bus with the CPU, a bus cycle needed for the DMAC data transfer stops CPU operations. That is to say, in response to a single activation request, the DMAC obtains a bus access right and occupies the bus between two bus cycles for reading and writing. When byte data is transferred from the RAM to the input/output circuit to increment transfer origin and destination addresses, the DMAC occupies the bus for six states of data transfer including two states for RAM access, three states for input/output circuit access, and one state for a dead cycle in the above-mentioned example. It should be noted that one state signifies once cycle of reference clock for the single-chip microcomputer or the semiconductor integrated circuit device.

When the DMA controller is connected to an external bus for the microcomputer, it is possible to perform operations of internal buses such as a ROM lead for the CPU in parallel with external bus transfer such as transferring received data to the memory by means of the external DMA controller. However, releasing the external bus access right causes a delay in recognizing an acknowledge signal or a request signal while the bus access right is exchanged. There is generated a time interval during which the microcomputer and the external DMA controller do not use the bus so as to prevent both from colliding with each other on the bus. This easily generates an overhead irrelevant to actual operations. Overheads, if occurring before and after a single data transfer, are not negligible in comparison with the time required for an actual data transfer. If a general-purpose DMA controller is used, it also provides unnecessary functions, unfavorable to cost effectiveness. Though it is possible to develop a DMA controller optimized for each system, this is apt to be disadvantageous to manufacturing costs and the like spent for the microcomputer and a different LSI chip.

The above-mentioned application (see patent document 2) by the inventors uses the on-chip configuration for an external bus DMAC that allows the microcomputer to transfer data on the external bus, enabling concurrent operations of the external bus and the microcomputer's internal bus. Concurrent operations are made available between the external bus DMAC's data transfer on the external bus and internal bus master's operations on the internal bus such as execution of instructions by the CPU using the internal bus. It is possible to simultaneously enable data transfer by the external bus DMAC on the external bus and instruction execution by the CPU using the internal bus, thus improving the microcomputer's throughput. Data can be transferred on the external bus without degrading the CPU throughput.

In short, the DMAC represented in the above-mentioned patent documents 1 and 2 is connected as a bus master to a single bus (either the internal bus or the external bus). The DMAC uses that bus to transfer data such as reading and writing. Accordingly, the DMAC continuously occupies the bus access right of the single bus during operations of accessing a source address and destination address.

By contrast, patent document 3 describes an example of providing buffer memory capable of reading or writing via interfaces provided correspondingly to two different data processing devices. There is provided the data transfer function for exchanging data between the above-mentioned buffer memory and the data processing devices corresponding to the two interfaces. In this case, data is transferred from peripheral processing devices to the buffer memory via the first interface. Further, data is transferred from the buffer memory to the main memory via the second interface. These two types of data transfers are performed independently. A request to transfer data is also issued independently.

[Patent document 1]
Japanese Unexamined Patent Publication No. Hei 5(1993)-307516A

[Patent document 2]
Japanese Unexamined Patent Publication No. 2000-235560

[Patent document 3]
Japanese Unexamined Patent Publication No. Hei 5(1993)-2557

SUMMARY OF THE INVENTION

The inventors examined improvement of the total throughput of the microcomputer and the like from the viewpoint of data transfer control. With an increasing demand for miniaturization of application systems and advancement in micro-fabrication of semiconductor integrated circuits, various interface circuits are being integrated into the microcomputer. Examples are a USB (universal serial bus) interface and an MMC (multimedia card) interface. Generally, since data input from such interface is temporarily stored in buffer RAM, the DMAC is used to transfer data from the interface to the buffer RAM. There is an increasing number of application devices that handle audio data and image data, necessitating a large amount of data to be transferred at a high speed. For example, the USB data transfer rate is 480 Mbps. If the CPU cannot use the bus to prevent a program from being executed during a period of data transfer, making it impossible to control the entire system and causing problems. In short, the USB interface or the like is used to receive a large amount of data too fast to permit interruptive processes by the CPU. On the contrary, a low interface speed sufficiently allows the CPU to interrupt at any time. Depending on situations, the CPU may need to process data stored in the buffer RAM. When the buffer RAM uses synchronous DRAM that is suitable for continuous accesses, it may be possible to provide faster processing by transferring the predetermined amount of data to the internal RAM, processing the data, and then rewriting the data to the buffer RAM rather than allowing the CPU to sequentially read and write data. In this case, the DMAC needs to ensure fast data transfer between the buffer RAM and the internal RAM. It is necessary to prevent a delay in the CPU processing time if the processed data is transferred or new data is input concurrently.

As represented in the above-mentioned patent documents 1 and 2, however, the DMAC is connected as a bus master to the single bus (one of the internal bus and the external bus) and uses that bus to transfer data for reading or writing. This delays processing of the CPU that shares the single bus. According to the technology of patent document 3, independent data transfer requests are issued to independently transfer data to and from the buffer memory via two different interfaces. This increases a time interval for a handshake sequence between the data transfer request and acknowledgment. It is considered to be difficult to improve effectiveness between data transfer processing and data processing by the CPU.

It is an object of the present invention to improve the efficiency of data transfer processing and concurrent data processing by the central processing unit.

It is another object of the present invention to provide a data transfer device, a semiconductor integrated circuit, and a microcomputer capable of concurrently enabling processing mainly comprising reading programs by the central processing unit and data transfer processing between various interface circuits and buffer memory and capable of improving the efficiency of both types of processing to be paralleled.

These and other objects and novel features of the invention may be readily ascertained by referring to the following description and appended drawings.

The following outlines major aspects of the present invention disclosed in this application.

[1] A data transfer device according to the present invention is connected to a first bus (IBUS) and a second bus (PBUS) and transfers data between these buses. The device can independently request a bus access right and output an address to the first and second buses. The device requests a bus access right of one bus for reading and requests a bus access right of the other bus for writing in response to one data transfer start request.

It is possible to independently request the bus access right and output addresses to the first and second buses, making it possible to solve the state of competing for the bus access right between both buses. While the bus access right of one bus is granted for reading or writing, the bus access right of the other bus can be released. When the central processing unit is connected to either the first or second bus, releasing the bus access right by the data transfer device enables data processing for the central processing unit.

In response to one data transfer start request, the bus access right is requested of one bus and the other bus, not using a sequence of requesting the bus access right in response to different data transfer requests for respective buses. It is possible to simplify a handshake sequence of a data transfer request and its acknowledgment and contribute to effective data transfer processing and data processing by a central processing unit.

As a preferred mode of the present invention, it is preferable to request a bus access right of the one bus and request a bus access right of the other bus at different timings. For example, a bus access right is requested of the one bus at a predetermined timing for read operations of the other bus granted a bus access right.

As a preferred mode of the present invention, the data transfer device has a plurality of data transfer channels and a control register to specify data transfer channel operations. The control register has a transfer request generation source specification area for defining correspondence between a data transfer channel to receive a transfer request and a transfer request generation source; a source bus specification area for defining correspondence between a data transfer channel and a transfer source bus; and a destination bus specification area for defining correspondence between a data transfer channel and a transfer destination bus.

[2] A semiconductor integrated circuit (1) according to a first aspect of the present invention comprises: a first bus (IBUS); a second bus (PBUS); a data transfer device (5) to transfer data between the first and second buses; a central processing unit (3) connected to the first bus; and program storage memory (7) which stores a control program for the central processing unit and is connected to the first bus. The data transfer device can independently request a bus access right and output an address to the first and second buses. The device requests a bus access right of one bus for reading and requests a bus access right of the other bus for writing at a different timing in response to one data transfer start request. The central processing unit is capable of bus access using the first bus in parallel with bus access using the second bus by means of the data transfer device. Likewise, as mentioned above, this makes it possible to not only concurrently allow data transfer processing and data processing by a central processing unit, but also improve the efficiency of both processing.

A semiconductor integrated circuit according to a second aspect of the present invention comprises: a first bus; a second bus; a data transfer device to transfer data between the first and second buses; a central processing unit connected to the first bus; and a bus control means (11) for the first and second buses. The data transfer device can independently request a bus access right and output an address to the first and second buses. The device requests a bus access right of one bus for reading and requests a bus access right of the other bus for writing at a different timing in response to one data transfer start request. The bus control means is capable of arbitration of bus access right requests and bus control for the first and second buses independently. Likewise, as mentioned above, this makes it possible to not only concurrently allow data transfer processing and data processing by a central processing unit, but also improve the efficiency of both processing.

A semiconductor integrated circuit according to a third aspect of the present invention comprises: a first bus(IBUS); a second bus(PBUS); a third bus(EXBUS, EXIFBUS); a central processing unit (3) connected to the first bus; program storage memory which stores a control program for the central processing unit and is connected to the first bus; and a data transfer device (5) capable of data transfer between the second and third buses. The data transfer device can independently request a bus access right and output an address to the second and third buses. The device requests a bus access right of one bus for reading and requests a bus access right of the other bus for writing at a different timing in response to one data transfer start request. The central processing unit is capable of bus access using the first bus in parallel with bus access using the second or third bus by means of the data transfer device. Likewise, as mentioned above, this makes it possible to not only concurrently allow data transfer processing and data processing by a central processing unit, but also improve the efficiency of data transfer processing in terms of a handshake sequence between a transfer request and acknowledgment.

As a preferred mode of the present invention, there is provided a bus control means (11) for the first through third buses. The bus control means is capable of arbitration of bus access right requests and bus control for the first through third buses independently. Further, the central processing unit can access the second or third bus from the first bus via the bus control means.

[3] A microcomputer according to the present invention comprises: a first bus(IBUS); a second bus(PBUS); a third bus(EXIFBUS, EXBUS); a central processing unit (3) connected to the first bus; program storage memory (7) which stores a control program for the central processing unit and is connected to the first bus; and a data transfer device (5) capable of data transfer between any two of the first through third buses. The data transfer device can independently request a bus access right and output an address to the first through third buses. The device requests a bus access right of one bus for reading and requests a bus access right of the other buses for writing at a different timing in response to one data transfer start request. Likewise, as mentioned above, this makes it possible to not only concurrently allow data transfer processing and data processing by a central processing unit, but also improve the efficiency of both processing.

As a preferred mode of the present invention, the central processing unit performs a bus access using the first bus in parallel with bus access using the second or third bus by means of the data transfer device. This is because the central processing unit's program memory is connected to the first bus. Further, there is provided a bus control means for the first through third buses. The bus control means is capable of arbitration of bus access right requests and bus control for the first through third buses independently. The central processing unit can access the second or third bus from the first bus via the bus control means.

For example, the bus control means has first to third bus control logic circuits. The first bus control logic circuit arbitrates bus requests from bus masters such as the central processing unit and the data transfer device to the first bus and grants a bus access right in accordance with predetermined priorities. The first bus control logic circuit checks an address output from the bus master to determine whether the address corresponds to the first, second, or third bus. When the address corresponds to the first bus, the first bus control logic circuit controls bus cycles of the first bus. When the address corresponds to the second bus, the first bus control logic circuit passes control to the second bus control logic circuit and waits until the bus cycle is complete. When the address corresponds to the third bus, the first bus control logic circuit likewise passes control to the third bus control logic circuit and waits until the bus cycle is complete.

The second bus control logic circuit centrally controls accesses to the second bus from the first bus' bus masters such as the central processing unit and the like and from the data transfer device in accordance with specifications such as the bus width specific to the address and the number of access states. At this time, the data transfer device outputs addresses and bus commands as special signals for using the second bus. Further, the second bus control logic circuit arbitrates accesses to the second bus from the first bus' bus masters such as the central processing unit and the like and bus access right requests for the second bus from the data transfer device.

The third bus control logic circuit has a divided address space and is capable of setting bus specifications such as memory types and the number of access states. The third bus control logic circuit centrally controls accesses to the third bus from the first bus' bus masters such as the central processing unit and the like and from the data transfer device. At this time, the data transfer device outputs addresses and bus commands as special signals for using the third bus. Further, the third bus control logic circuit arbitrates access requests for the third bus from the first bus' bus masters such as the central processing unit and the like and access requests from the data transfer device and the other external bus modules.

As a preferred mode of the present invention, the data transfer device has a plurality of data transfer channels and a control register to specify data transfer channel operations. The control register has a transfer request generation source specification area for defining correspondence between a data transfer channel to receive a transfer request and a transfer request generation source; a source bus specification area for defining correspondence between a data transfer channel and a transfer source bus; and a destination bus specification area for defining correspondence between a data transfer channel and a transfer destination bus. A central processing unit can access the control register.

DETAILED DESCRIPTION OF THE PREFERRED EMBODIMENTS

Figure 1:
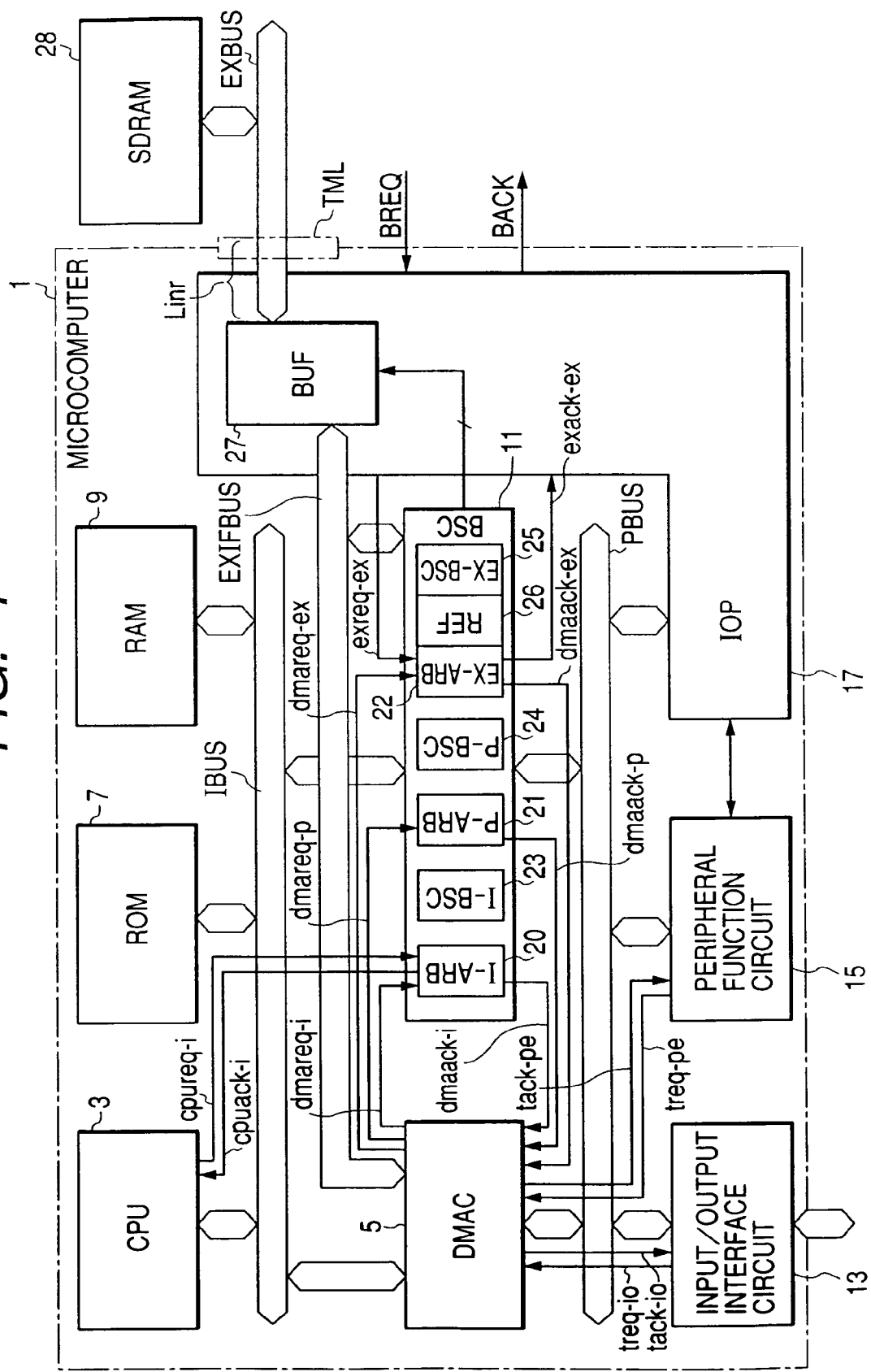
FIG. 1 is a block diagram of a microcomputer according to an example of the present invention.

FIG. 1 shows a microcomputer according to an example of the present invention. Though not subject to special requirements, a microcomputer 1 in FIG. 1 is formed on a semiconductor substrate such as silicon single crystal by means of the CMOS integrated circuit fabrication technology.

The microcomputer 1 comprises: a central processing unit (CPU)3; a DMA controller (DMAC) 5; read-only memory (ROM) 7; random access memory (RAM) 9; a bus controller (BSC) 11; an input/output interface 13; a peripheral function circuit 15; and an input/output port (IOP) 17. Though not shown in FIG. 1, the microcomputer 1 further comprises functional blocks or modules such as an interrupt controller, a clock oscillator, and the like. The peripheral function circuit 15 comprises, for example, a timer, a pulse output circuit, a serial communication interface (SCI), and an A/D converter (A/D).

The CPU 3 mainly functions and reads instructions mainly from the ROM 7 for operations to read or write data to the RAM 9 as a working data area. The program memory for the CPU 3 may be not only the ROM 7, but also cache memory. Likewise, the cache memory can be also used for data memory of the CPU 3.

The DMAC 5 shares a first I bus (internal bus) IBUS with the CPU 3 and can transfer data instead of the CPU 3. The peripheral function circuit 15 and the input/output interface circuit 13 request to start data transfer in response to transfer request signals treq-io and treq-pe typically represented by the DMAC 5. The DMAC 5 transfers data in response to the start request and then returns typical transfer acknowledge signals tack-io and tack-pe to clear the initiation factor. The interrupt controller may be used to determine or clear initiation factors.

The microcomputer 1 has the internal bus (I bus) IBUS as the first bus, a peripheral bus (P bus) PBUS as the second bus, an external interface bus (EXIFBUS), and an external bus (EX bus) EXBUS leading to the outside of the chip. These buses are used to connect the internal circuit modules. The buses include not only an address bus and a data bus, but also bus commands (or read signal, write signal, and bus size signal) and a ready signal (or a wait signal). The microcomputer 1 as the semiconductor integrated circuit has an internal line Linr as the external bus EXBUS. The internal line Linr leads to an external terminal TML connected to a bus signal line outside the chip. Strictly speaking, a third bus provided for the microcomputer 1 as the semiconductor integrated circuit corresponds to the above-mentioned internal line Linr for the external interface bus EXIFBUS and the external bus EXBUS. In this specification, these buses are also simply referred to as the external bus EXBUS for convenience.

The internal bus IBUS is directly connected to the CPU 3 and the other internal bus masters. The memories 7 and 9 are also connected to the internal bus IBUS for fast access to memories. The memories 7 and 9 are accessed in the 1 state.

The peripheral bus PBUS connects with the input/output interface circuit 13, the peripheral function circuit 15, and an internal I/O register included in an input/output port 17. Separating the internal bus IBUS from the peripheral bus PBUS decreases loads on the internal bus IBUS mainly used for reading programs by the CPU 3 to accelerate processing. When the peripheral bus PBUS is not used, its state is maintained for conveniently saving the power consumption. The CPU 3 accesses the internal I/O register connected to the peripheral bus PBUS via the internal bus IBUS and the bus controller 11. The internal I/O register is accessed in the 2-state.

The internal bus IBUS interfaces with the external bus EXBUS via the external interface bus EXIFBUS and an external bus buffer circuit (BUF) 27 under control of the bus controller 11. Though not subject to special requirements, the external bus buffer circuit (BUF) 27 is included in the input/output port (IOP) 17. The internal bus IBUS interfaces with the peripheral bus PBUS under control of the bus controller 11.

The bus controller 11 controls the buses IBUS, PBUS, and EXBUS. Corresponding to each bus, the bus controller 11 has an internal bus arbiter (I-ARB) 20, a peripheral bus arbiter (P-ARB) 21, an external bus arbiter (EX-ARB) 22, an internal bus controller (I-BSC) 23, a peripheral bus controller (P-BSC) 24, an external bus controller (EX-BSC) 25, and a refresh timer (REF) 26. The bus controller 11 controls the external bus EXBUS via the external interface bus EXIFBUS and the external bus buffer circuit (BUF) 27.

The internal bus IBUS is connected to the DMAC 5, the ROM 7, the RAM 9, the external bus buffer circuit (BUF) 27, and the bus controller 11. Here, the CPU 3 and the DMAC 5, as internal bus masters, can use the internal bus IBUS. The DMAC 5 requests the bus access right based on a bus access right request signal dmareq-i. The CPU 3 requests the bus access right based on a bus access right request signal cpureq-i. When the bus access right request signals dmareq-i and cpureq-i are issued to request the bus access right, the internal bus arbiter 20 performs a necessary arbitration according to a predetermined priority and provides the CPU 3 or the DMAC 5 with the bus access right. Permission of the bus access right is notified by bus access right acknowledge signals cpuack-i and dmaack-i. In this manner, the CPU 3 and the DMAC 5 exclusively use the internal bus IBUS. The internal bus master, when provided with the bus access right, outputs an address signal and a bus command to the internal bus IBUS for accessing the bus. The internal bus controller 23 decodes the address signal output from the CPU 3 to the internal bus IBUS. When the access is made to a circuit module on the internal bus IBUS such as the ROM 7, the internal bus controller 23 controls the bus using the internal bus IBUS. When the access is made to a circuit module on the peripheral bus PBUS such as the internal I/O register of the peripheral function circuit 15, the internal bus controller 23 activates the peripheral bus controller 24 to deactivate the bus ready signal on the internal bus IBUS and allow the CPU 3 to wait. Further, the internal bus controller 23 requests the peripheral bus arbiter 21 for the bus access right to the peripheral bus. When the bus access right request is acknowledged, the internal bus controller 23 controls the peripheral bus PBUS. When the access is made to a circuit module on the external bus EXBUS, the internal bus controller 23 activates the external bus controller 25 to deactivate the bus ready signal on the internal bus IBUS and allow the CPU to wait. Further, the internal bus controller 23 requests the external bus arbiter 22 for the bus access right to the external bus EXBUS. When the bus access right request is acknowledged, the internal bus controller 23 controls the external bus EXBUS.

The peripheral bus PBUS is connected to the bus controller 11, the DMAC 5, the input/output interface circuit 13, the peripheral function circuit 15, and an IOP 17. The peripheral bus controller 24 controls the peripheral bus PBUS. The DMAC 5 functions as a peripheral bus master connected to the peripheral bus PBUS. The peripheral bus arbiter 21 arbitrates the bus access right to the peripheral bus PBUS. The DMAC 5 outputs a bus access right request signal dmareq-p to the peripheral bus arbiter 21. The peripheral bus arbiter 21 returns a bus access right acknowledge signal dmaack-p to the DMAC 5. The peripheral bus arbiter 21 arbitrates a request for the bus access right from the DMAC 5 and a request to use the bus from the internal bus controller 23 due to the access from the CPU 3 according to predetermined priorities and acknowledges the bus access right to either. When the DMAC 5 is granted the bus access right, the DMAC 5 outputs an address signal and a bus command to the peripheral bus PBUS for accessing the bus. When the acknowledgment is made for the request from the internal bus controller 23 to use the bus due to the access from the CPU 3, the peripheral bus controller 24 controls the bus using the peripheral bus IBUS. As mentioned above, the internal bus arbiter 20 once arbitrates the bus access right of the CPU 3. When the CPU 3 granted the bus access right is to access the peripheral bus PBUS, the peripheral bus access right is to be requested via the internal bus controller 23. In other words, the CPU 3 does not request the peripheral bus access right while using the internal bus IBUS. While the CPU 3 uses the internal bus IBUS, the DMAC 5 is ensured to concurrently read or write data on the peripheral bus PBUS.

Though not subject to special requirements, the external bus EXBUS is connected to the bus controller 11 and the DMAC 5 via the external bus buffer circuit (BUF) and the external interface bus EXIFBUS. In FIG. 1, the external bus EXBUS connects with a synchronous DRAM (SDRAM) 28 representatively indicated as a chip independent of the microcomputer 1. The external bus controller 25 controls the external bus EXBUS. When the DRAM is connected to the external bus EXBUS, the external bus controller 25 also controls address multiplexing and the like. External bus masters capable of using the external bus EXBUS include the CPU 3, the DMAC 5, the refresh timer 26, and another external bus master (not shown) The external bus arbiter 22 arbitrates bus access right requests from these bus masters. The DMAC 5 issues dmareq-ex as a bus access right request signal and receives dmaack-ex as a bus access right acknowledge signal. An exreq-ex signal supplies bus access right request signal BREQ from the external bus master. The corresponding bus access right acknowledge signal exack-ex is supplied as bus access right acknowledge signal BACK to the external bus master. When the DMAC 5 is granted the bus access right, the DMAC 5 outputs an address signal and a bus command to the external bus EXBUS from the external interface bus EXIFBUS for accessing the external bus. When the refresh timer 26 is granted the bus access right, the external bus controller 25 outputs an address signal and a bus command to the external bus EXBUS from the external interface bus EXIFBUS for bus access to refresh the SDRAM 28 on the external bus. When the external bus arbiter 22 acknowledges a request to use the bus from the internal bus controller 23 due to the access from the internal bus master, the external bus controller 24 performs bus control using the external interface bus EXIFBUS and the external bus EXBUS. As mentioned above, the internal bus arbiter 20 once arbitrates the bus access right of the CPU 3. When the CPU 3 is granted the bus access right to access the external bus, the CPU 3 requests the external bus access right. In other words, the CPU 3 does not request the external bus access right while using the internal bus IBUS. When the CPU 3 uses the internal bus IBUS, the DMAC 5 and the refresh timer 26 are ensured to access the external bus EXBUS or release the bus access right to the external bus master.

The refresh timer 26 generates a refresh request at a predetermined time interval. When granted the external bus access right, the refresh timer 26 performs CAS-before-RAS refresh to refresh the SDRAM, for example. When the external bus master is granted the external bus access right, the external bus (address bus, data bus, or control signal) EXBUS is made to a high impedance state. This enables the external bus master to use the external bus and activates the external bus access right acknowledge signal BACK to notify it.

As mentioned above, the DMAC 5 can output a bus access right request to the internal bus IBUS, the peripheral bus PBUS, and the external bus EXBUS independently. Depending on the bus used for data transfer, the DMAC can output internal bus access right request dmareq-i, peripheral bus access right request dmareq-p, and external bus access right request dmareq-ex to any of the internal bus arbiter 20, the peripheral bus arbiter 21, and the external bus arbiter 22, respectively. When requesting the internal bus access right, the DMAC 5 supplies internal bus access right acknowledge signal dmaack-i to confirm the acknowledgment of the internal bus access right. The DMAC 5 then issues an internal bus command and an address to access the internal bus IBUS. Likewise, when requesting the peripheral bus arbiter 21 for the peripheral bus access right, the DMAC 5 supplies peripheral bus access right acknowledge signal dmaack-p to confirm the acknowledgment of the peripheral bus access right. The DMAC 5 then issues a peripheral bus command and an address to access the peripheral bus PBUS. The same applies to the external bus.

As mentioned above, the CPU 3 can request the internal bus IBUS for the bus access right and use the peripheral bus PBUS and the external bus EXBUS via the internal bus IBUS.

The CPU 3 or the DMAC 5 reads or write data to the ROM 7 and the RAM 9 as internal bus slaves or to the functional blocks such as the input/output interface circuit 13, the peripheral function circuit 15, and the IOP 17 as peripheral bus slaves. According to transfer control data settings and the like, the CPU 3 defines the DMAC 5 to be a peripheral bus slave capable of reading or writing.

The following outlines the other functions provided for the microcomputer 1. For example, an interrupt controller (not shown) inputs interrupt signals output from the functional blocks such as the input/output interface circuit 13, the peripheral function circuit 15, and the IOP 17 and outputs interrupt request signals to the CPU 3. The IOP 17 is used together with external bus signals (address bus output, data bus input/output, and bus control signal input/output) and input/output signals of a timer, a pulse output circuit, and the like constituting the peripheral function circuit 15. Though not shown in the figure, there are further provided a power terminal, a circuit ground terminal, an analog power terminal, an analog ground terminal, a reset input terminal, a standby input terminal, an interrupt input terminal, a clock input terminal, an operation mode terminal, and the like.

Figure 2:
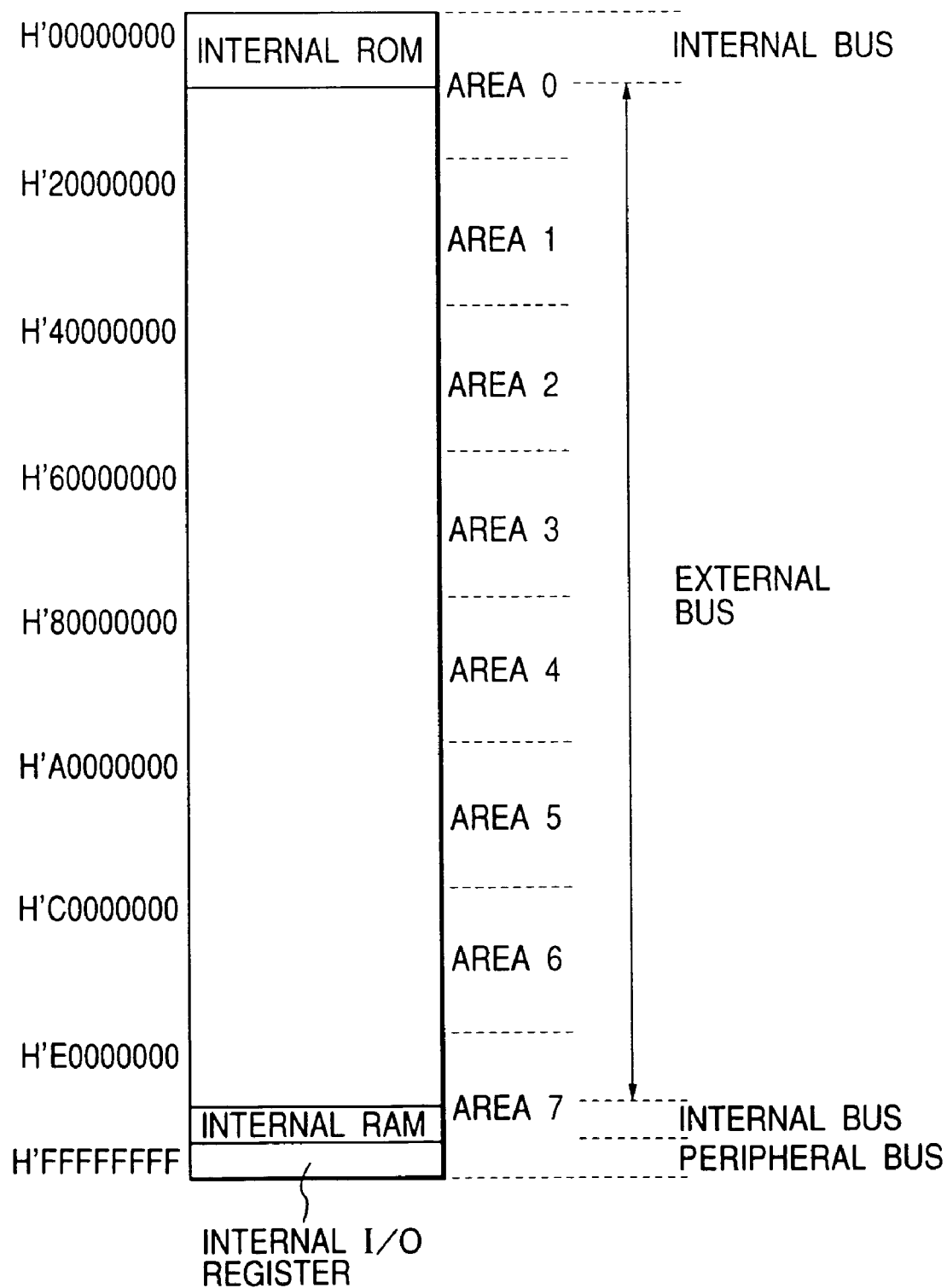
FIG. 2 shows an address map exemplifying the address space of the CPU.

FIG. 2 exemplifies an address space of the CPU 3. Though not subject to special requirements, the CPU 3 has the 4-gigabyte address space and is divided into eight areas. According to settings of the bus controller 11, these areas are independently capable of configuring a bus width and the number of access states. The external bus controller 25 controls an external bus space. On the other hand, the ROM 7, the RAM 9, and the internal I/O register in the microcomputer 1 operate on specific bus widths and access states independently of the setting of the bus controller 11. As mentioned above, the internal ROM 7 and RAM 9 are connected to the internal bus IBUS and is subject to read/write operations in the 1-state. The internal I/O register is connected to the peripheral bus PBUS and is subject to read/write operations in the 2-state.

Figure 3:
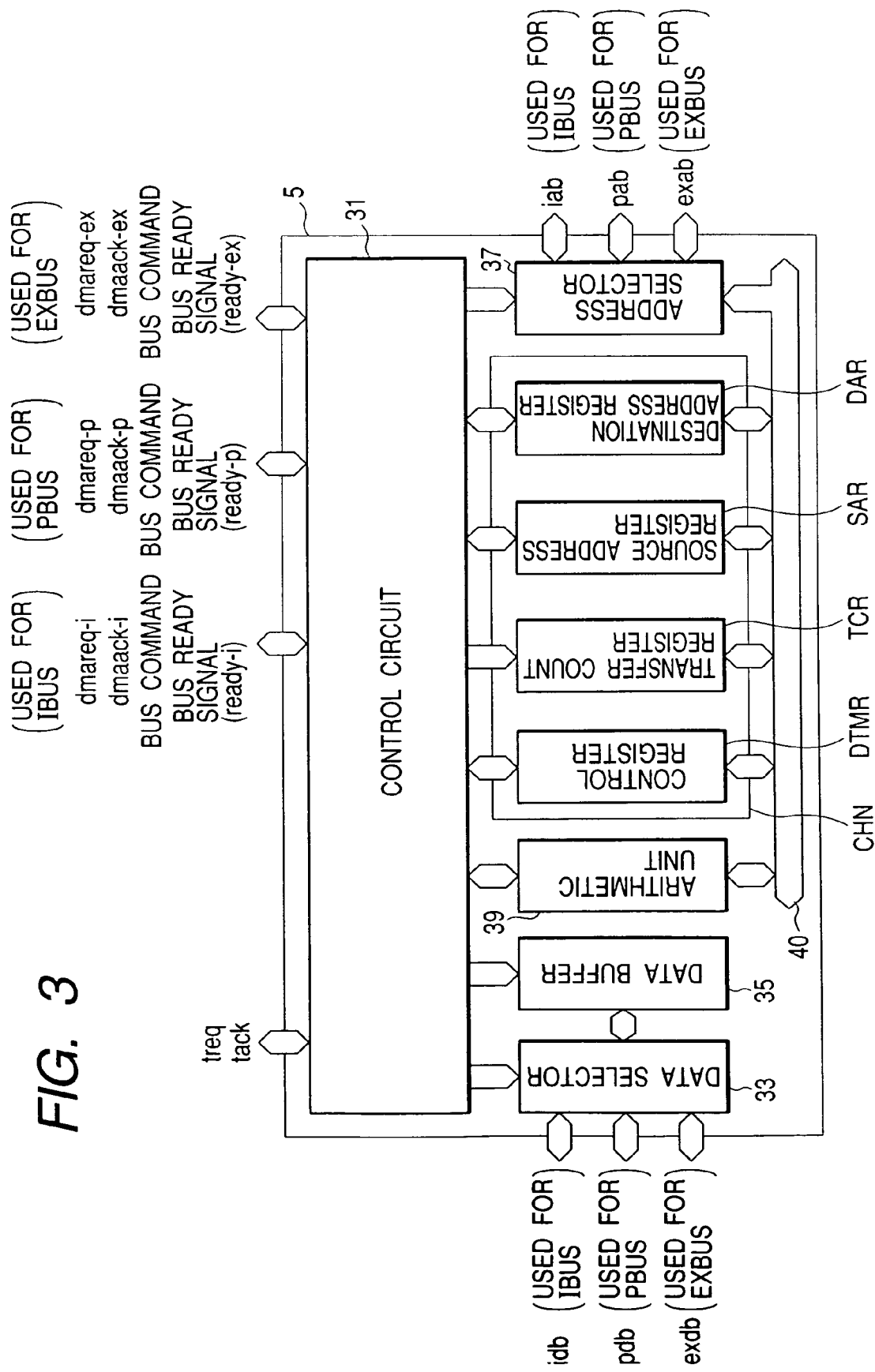
FIG. 3 is a block diagram exemplifying details of a DMAC.

FIG. 3 exemplifies a block diagram of the DMAC 5. Though not subject to special requirements, the DMAC 5 has four data transfer channels. FIG. 3 representatively shows one data transfer channel CHN. The DMAC 5 has a control circuit 31, a data selector 33, a data buffer 35, an address selector 37, and an arithmetic unit (AU) circuit 39 in common with each data transfer channel. Each data transfer channel CHN of four channels is provided with a control register DTMR, a destination address register DAR, a source address register SAR, and a transfer count register TCR to be described later.

The DMAC 5 inputs a plurality of transfer request signals treq represented by treq-io and treq-pe as mentioned above. When performing the corresponding data transfer, the DMAC 5 outputs a plurality of transfer acknowledge signals tack represented by tack-io and tack-pe as mentioned above.

As mentioned above, the DMAC 5 is capable of data input/output independent of the three buses IBUS, PBUS, and EXBUS. When data is transferred in response to one data transfer start request generated by one transfer request signal, the DMAC 5 requests the bus access right to the bus corresponding to each of a transfer source address and a transfer destination address at respective timings for reading or writing data to the bus to be accessed. The DMAC 5 issues the dedicated bus access right request signals dmareq-i, dmareq-p, and dmareq-ex to the internal bus arbiter 20, the peripheral bus arbiter 21, and the external bus arbiter 22, respectively to request the bus access right of each bus arbiter. The DMAC 5 is then notified of acknowledgment of the bus access right by means of the dedicated bus access right acknowledge signals dmaack-i, dmaack-p, and dmaack-ex. When notified of acknowledgment of the bus access right, the DMAC 5 generates a bus command and outputs an address to the bus to be accessed for access operations in response to a ready state of the bus ready signal output from the corresponding bus controller. The data transfer channel to be used is set to the control register DTMR of each data transfer channel in correspondence with the transfer request. The bus used for data transfer is set to the control register DTMR of each data transfer channel. It may be preferable to determine a bus to be used by decoding addresses predetermined in the source address register SAR and the destination address register DAR.

The DMAC 5 once stores data read from data bus idb (for IBUS), pdb (for PBUS), or exdb (for EXBUS) of the source bus for which the bus access right is granted, in the data buffer 35 via the data selector 33. The DMAC 5 then rewrites that data to data bus idb (for IBUS), pdb (for PBUS), or exdb (for EXBUS) of the destination bus for which the bus access right is granted, via the data selector 33. In this manner, it is possible to independently select a bus for reading and a bus for writing.

The address selector 37 inputs the contents of the source address register SAR or the destination address register DAR from an internal bus 40 of the DMAC 5. The address selector 37 then outputs the contents to address bus iab (for IBUS), pab (for PBUS), or exab (for EXBUS) of the bus for which the bus access right is granted.

The arithmetic unit circuit 39 increments or decrements the source address register SAR and the destination address register DAR and decrements the transfer count register TCR. The transfer count register TCR contains an initial value for the number of data transfers or transfer words.

The control circuit 31 detects the transfer request signal treq to initiate an operation and controls bus access right requests as well as bus command and address outputs. In addition, the control circuit 31 inputs the bus access right acknowledge signal tack and the bus ready signal and concurrently controls bus operations. Though not shown in the figure, the CPU 3 performs read/write operations as a peripheral bus interface for the DMAC 5. For this purpose, the peripheral bus controller 24 outputs a module select signal, a read signal, a write signal, low-order bits of an address to the peripheral bus PBUS, and inputs or outputs data to the peripheral bus. In accordance with these operations, the control circuit 31 can perform initialization or read setup data for the registers SAR, DAR, TCR, and DTMR of each data transfer channel, i.e., one of internal I/O registers.

Figure 4:
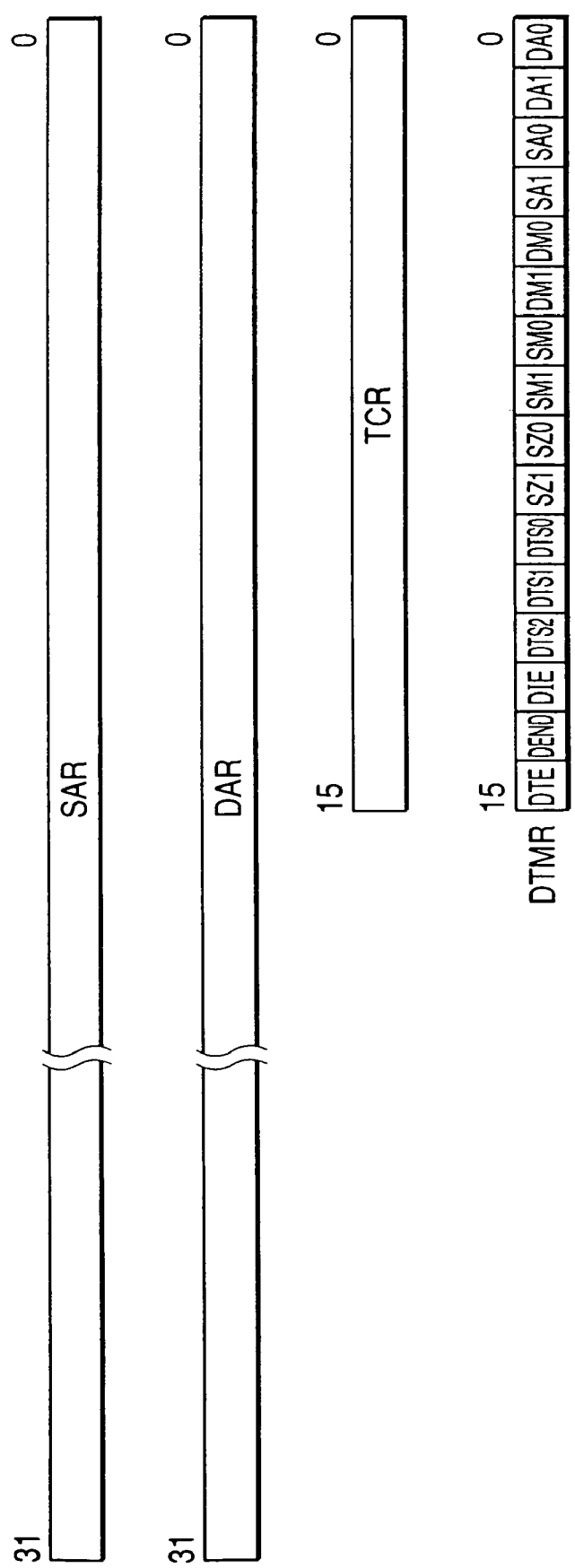
FIG. 4 exemplifies details of a register configuration for one data transfer channel of the DMAC.

FIG. 4 exemplifies details of the register configuration of the DMAC 5 for one data transfer channel. Though not subject to special requirements, the source address register SAR and the destination address register DAR are configured in 32 bits and store transfer source and destination addresses. Though not subject to special requirements, these registers can directly specify all areas in the 4-gigabyte address space of the microcomputer.

Though not subject to special requirements, the transfer count register TCR is configured in 16 bits and stores the number of data transfers. The transfer count register TCR is decremented each time data is transferred in response to one start request.

The control register DTMR controls a transfer mode of the DMAC 5 and the like. Each bit of the DTMR functions as follows.

Bit 15 functions as a DTE bit to permit DMAC operations for the relevant channel. When the transfer request signal is activated with the DTE bit set to 1, the corresponding data transfer channel starts operating.

Bit 14 is a DEND flag and is set to 1 when the predetermined number of transfers terminates, i.e., when TCR is reset to 0.

Bit 13 is a DIE bit and allows an interrupt. When both the DIE and DEND bits are set to 1, the CPU 3 is requested to be interrupted. When the DIE bit is set to 1 and the DEND flag is set to 1, the DTE bit is reset to 0. An operation of the data transfer channel is interrupted, awaiting a process by the CPU 3.

Bits 2 through 0 correspond to DTS bits 2 through 0 and specify a source of generating a transfer request as a trigger to start the transfer operation. For example, 000 specifies a start request based on input completion of the input/output interface circuit 13; 001 specifies a start request based on output completion of the input/output interface circuit 13; 010 specifies a start request based on a first compare match of the timer; 011 specifies a start request based on a second compare match of the timer; 100 specifies a start request based on input completion of SCI; 101 specifies a start request based on output completion of SCI; and 110 specifies a start request based on an external request.

Bits 9 and 8 correspond to SZ1 and SZ0 bits and specify a size per data transfer: 01 for a byte; 10 for a word (2 bytes); and 11 for a long word (4 bytes).

Bits 7 and 6 correspond to SM1 and SM0 bits and specify whether to increment, decrement, or fix the source address register SAR after data transfer. Resetting the SM1 bit to 0 fixes the source address register SAR. When the SM1 bit is set to 1, resetting the SM0 bit to 0 increments the source address register SAR; and setting the SM0 bit to 1 decrements it.

Bits 5 and 4 correspond to DM1 and DM0 bits and specify whether to increment, decrement, or fix the destination address register DAR after data transfer. Resetting the DM1 bit to 0 fixes the destination address register DAR. When the DM1 bit is set to 1, resetting the DM0 bit to 0 increments the destination address register DAR; and setting the DM0 bit to 1 decrements it.

Bits 3 and 2 correspond to SA1 and SA0 bits and select a bus to be used as the source address. The bus access right is requested to the internal bus IBUS when the bits are set to 00 or 01; to the peripheral bus PBUS when the bits are set to 10; and to the external bus EXBUS when the bits are set to 11.

Bits 1 and 0 correspond to DA1 and DA0 bits and select a bus to be used as the destination address. These bits are predetermined in the same manner as the SA1 and SA0 bits.

It is possible to easily determine a bus to be used by using the bus specification bits SA1, SA0, DA1, and DA0 rather than specifying source and destination addresses.

Figure 5:
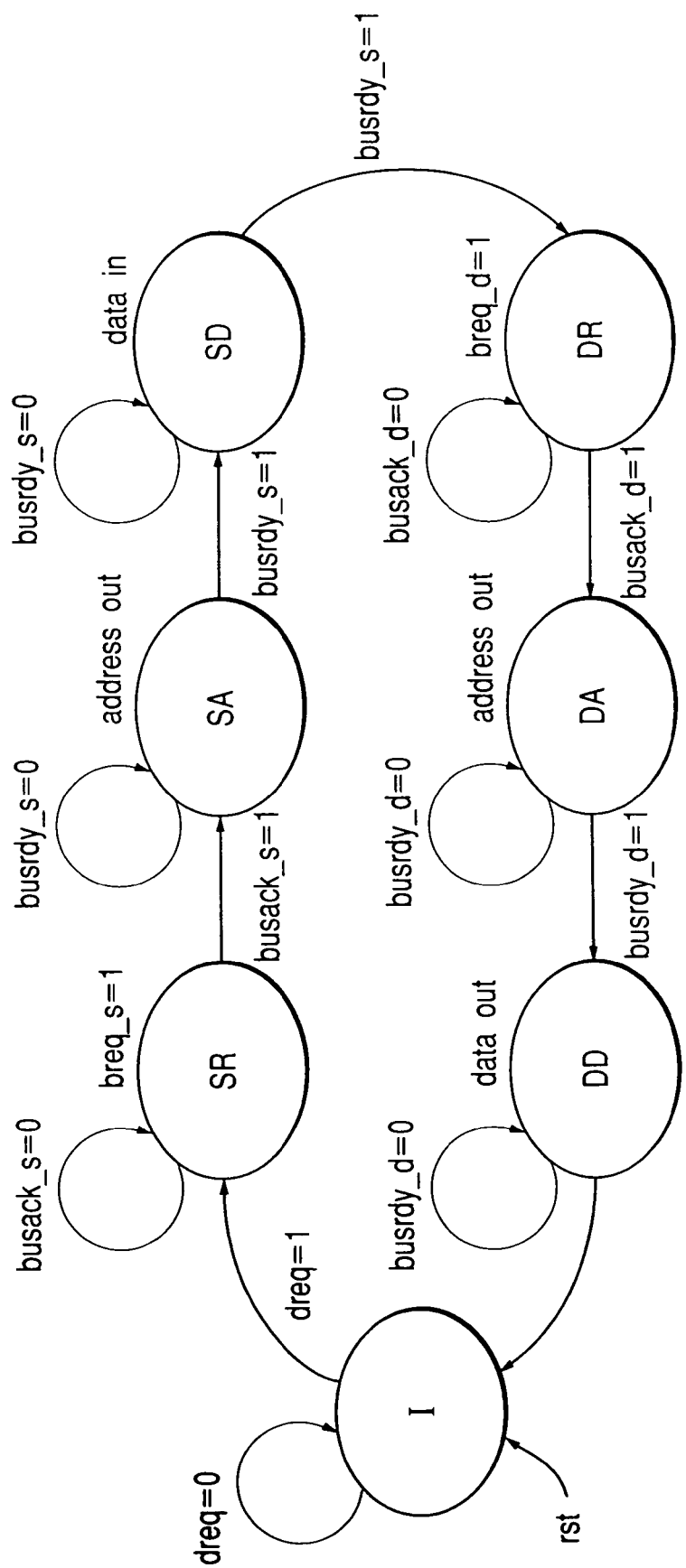
FIG. 5 is a state transition diagram of data transfer control by the DMAC.

FIG. 5 exemplifies a state transition diagram of the DMAC 5. This state transition is implemented by the logic in the control circuit 31 of the DMAC 5.

The DMAC 5 has seven states: state I (idle); state SR (source request); state SA (source address); state SD (source data); state DR (destination request); state DA (destination address); and state DD (destination data).

After a reset, the DMAC 5 changes to state I. State I samples a request signal to start the DMAC 5. Setting the transfer enable bit of any channel to 1 detects a request to start the channel. When a plurality of channels is started, channel 0 is given the highest priority for operations.

When the start request causes a predetermined input (dreq=1), the DMAC 5 changes to the state SR. The state SR requests the bus access right (breq_s=1) to any of the buses predetermined as a source, i.e., the internal bus IBUS, the peripheral bus PBUS, and the external bus EXBUS. As mentioned above, the SA1 and SA0 bits of the control register DTMR can be used to determine to which bus the bus access right should be requested. There are provided the contents of the source address register SAR for the data transfer channel corresponding to the start request. The DMAC 5 changes to state SA when the bus access right acknowledge signal is active (busack_s=1) in response to the request for the bus access right and the bus is detected to be ready. State SA outputs the contents of the source address register SAR for the channel to a predetermined address bus and outputs a bus command to the bus. When the peripheral bus is accessed, for example, the peripheral bus controller 24 activates the peripheral bus PBUS. When the access to the peripheral bus terminates, the peripheral bus ready signal becomes active and is returned to the DMAC 5.

When detecting the active state (busrdy_s=1) of the bus ready signal for the bus, the DMAC 5 changes to state SD. State SD stores read data in the data buffer 35.

The DMAC 5 then changes to state DR. State DR requests the bus access right to any of the buses predetermined to be the destination, i.e., the internal bus IBUS, the peripheral bus PBUS, and the external bus EXBUS. There are provided the contents of the destination address register DAR for the data transfer channel corresponding to the start request. The DMAC 5 changes to state DA when the bus access right acknowledge signal is active (busack_d=1) in response to the request for the bus access right and the bus is detected to be ready.

State DA outputs the contents of the destination address register DAR for the channel to a predetermined address bus and outputs a bus command to the bus. When the internal bus is accessed, for example, the internal bus controller 23 activates the internal bus. When the access to the internal bus terminates, the internal bus ready signal becomes active (busrdy_d=1). When detecting that the bus is ready, the DMAC 5 changes to state DD.

Sate DD decrements the transfer count register TCR. Data in the data buffer 35 is output to the destination bus. When the bus ready signal becomes active (busrdy_d=1), the DMAC 5 changes to state I to terminate the operation of one data transfer.

Figure 6:
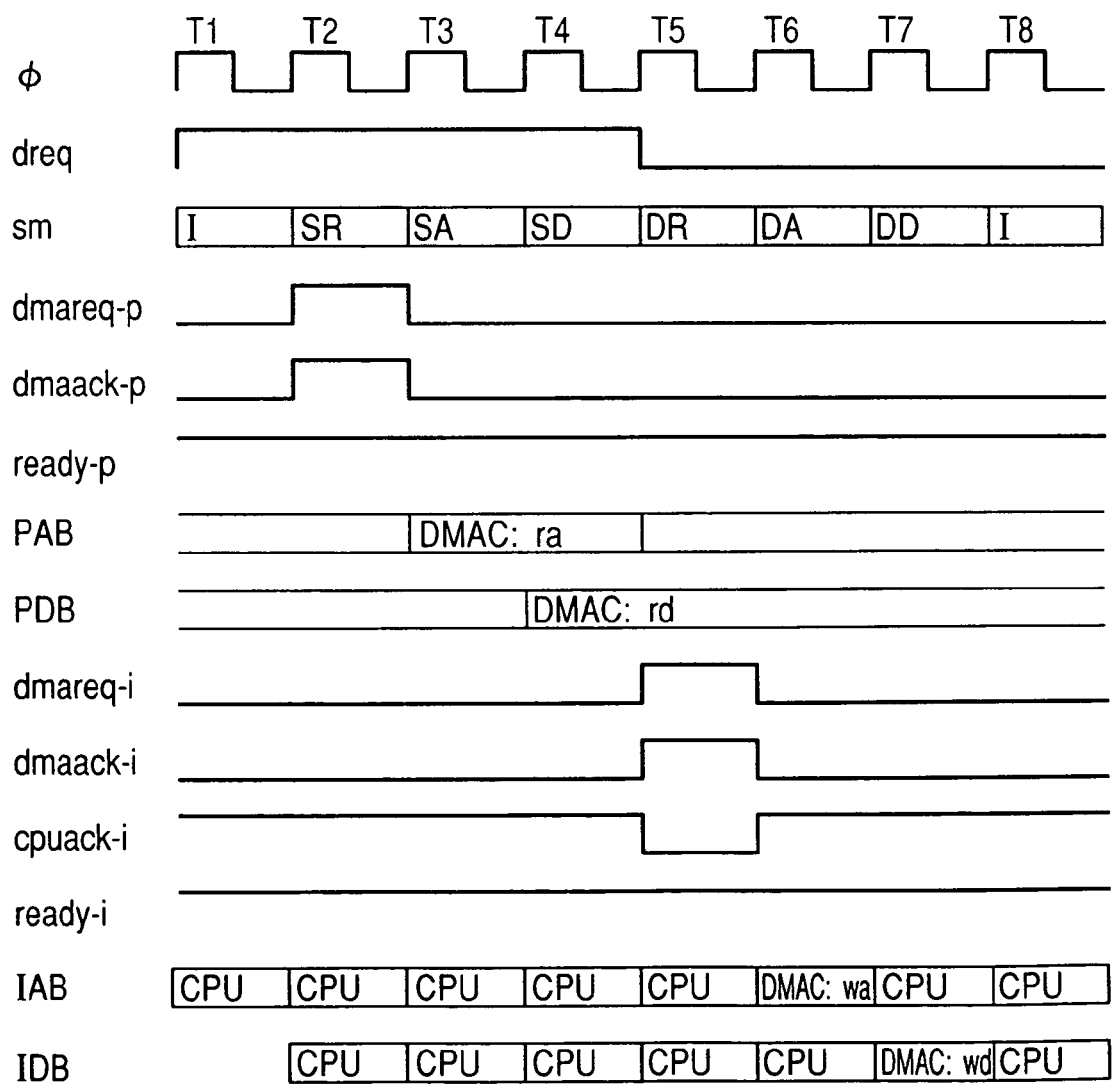
FIG. 6 is a timing chart for the first example of using the DMAC.

FIG. 6 shows operation timing for the first example of using the DMAC 5. The first example represents data transfer between the input/output interface circuit 13 and the internal RAM 9.

The internal bus IBUS pipelines bus access right arbitration, output of the IAB (address bus of the internal bus IBUS), and input/output of the IDB (data bus of the internal bus IBUS). The bus state changes when bus ready signal ready-i for the internal bus IBUS is active or when bus ready signal ready-p for the peripheral bus PBUS is active. When ready-i is set to 1, the signal dmaack-i=1 or cpuack-i=1 grants the bus access right to the bus master which then uses the IAB at the next clock and later to output addresses. Addresses are used when ready-i is set to 1. The bus master that has been outputting addresses so far uses the IDB at the next clock and later to input or output data.

The peripheral bus PBUS and the external bus EXBUS do not pipeline addresses and data. Addresses are output during a 2-state period. Data is input and output at the second state of the address output. The external bus EXBUS is capable of appropriately inserting waits and providing predetermined accesses for interface with the associated memory.

In FIG. 6, state T1 activates data transfer start request signal dreq for input/output interfaces to start the DMAC 5.

At state T2, the DMAC 5 activates dmareq-p (dmareq-p=1) to request the bus access right to the peripheral bus PBUS. Since the CPU 3 does not access the peripheral bus, the peripheral bus arbiter activates dmaack-p (dmaack-p=1) to grant the bus access right to the DMAC 5.

The DMAC 5 outputs an address to the peripheral bus PAB at state T3 (DMAC:ra) and incorporates the contents of the peripheral bus PDB at state T4 (DMAC:rd). The DMAC 5 reads a predetermined internal I/O register of the input/output interface circuit as well as a transfer acknowledge signal (not shown) to inactivate the data transfer start request signal dreq.

At state T5, the DMAC 5 activates dmareq-i (dmareq-i=1) and requests the bus access right to the internal bus IBUS. Since a higher priority is given from the CPU 3, the internal bus arbiter 20 activates dmaack-i (dmaack-i=1) to grant the bus access right to the DMAC 5.

The DMAC 5 outputs addresses to the address bus IAB at state T6 (DMAC:Wa) and outputs the read data to the data bus IDB at state T7 (DMAC:wd).

As clearly understood from the operation timing in FIG. 6, the CPU 3 transfers the bus access right to the DMAC 5 for one state and stops operations. The internal bus IBUS is used for only writing with respect to data transfer. Accordingly, it is possible to minimize an unnecessary wait state during which the internal bus IBUS is unavailable. Though not shown in the figure, almost the same operation takes place when data is read from the external bus and is transferred to the internal bus.

Figure 7:
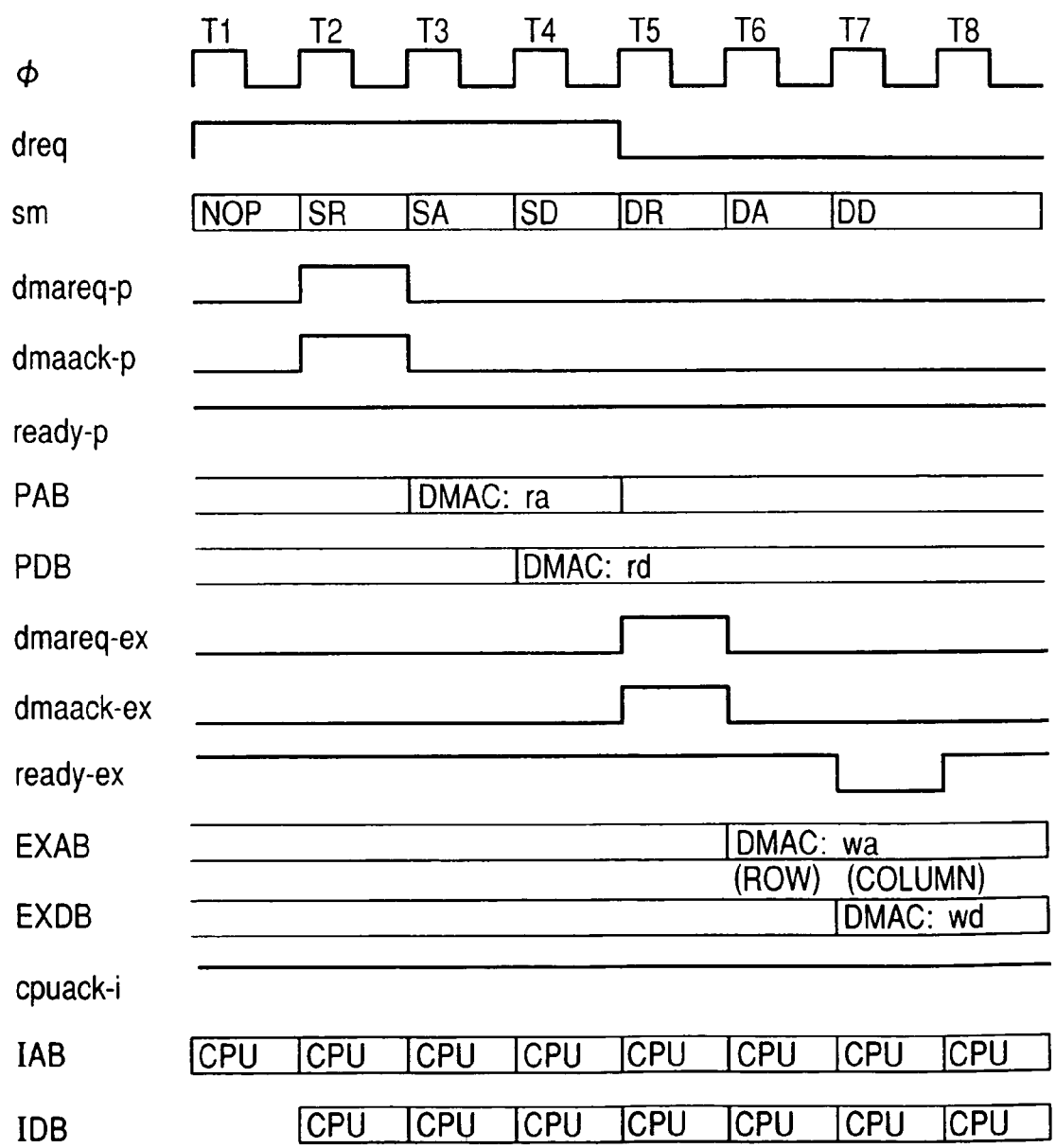
FIG. 7 is a timing chart for the second example of using the DMAC.

FIG. 7 is a timing chart for the second example of using the DMAC 5. The example here represents data transfer between the input/output interface circuit 13 and the SDRAM 28 connected to the external bus EXBUS.

The timing up to state T4 is the same as that in FIG. 6. At state T5, the DMAC 5 activates dmareq-ex (dmareq-ex=1) to request the bus access right to the internal bus IBUS. Since a higher priority is given from the CPU 3, the internal bus arbiter 20 activates dmaack-ex (dmaack-ex=1) to grant the bus access right to the DMAC 5.

From state T6, the DMAC 5 outputs addresses to the external address bus EXAB (address bus of the external bus EXBUS). For the SDRAM 28, the DMAC 5 outputs row addresses at state T6 and column addresses at states T7 and T8. Further at states T7 and T8, the DMAC 5 outputs the read data to the EXDB. Meanwhile, state T7 inactivates the bus ready signal ready-ex (ready-ex=0) for the external bus EXBUS, allowing the state transition of the DMAC 5 to wait. When there is a match between high-order addresses (row addresses) of the SDRAM 28 to be written, column address can be output at states T6 and T7 by omitting a state to output row addresses.

As clearly understood from the operation timing in FIG. 7, the CPU 3 can use the internal bus IBUS also during data transfer by the DMAC 5 using the peripheral bus PBUS and the external bus EXBUS. This makes it possible to minimize an unnecessary wait state.

Figure 8:
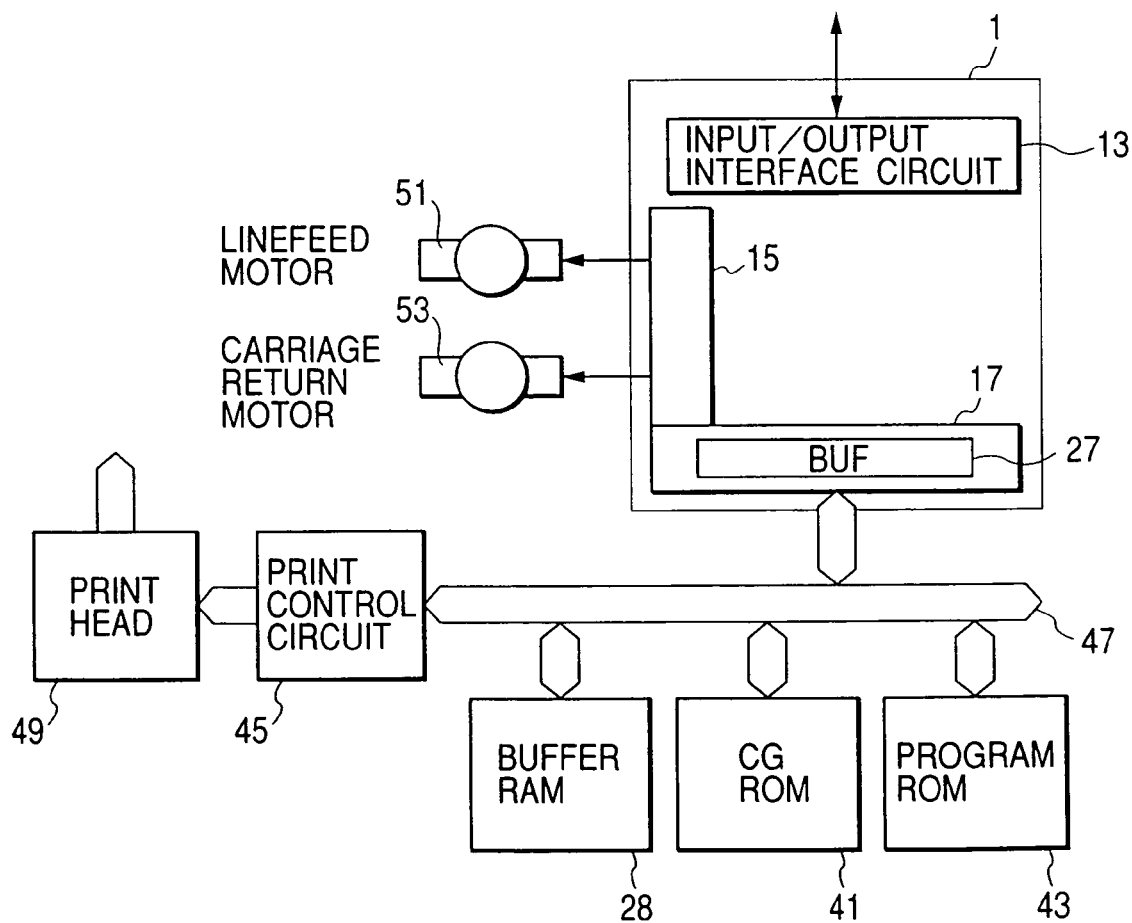
FIG. 8 is a block diagram exemplifying a microcomputer system using the microcomputer for printer control.

FIG. 8 exemplifies a microcomputer system using the microcomputer 1 for printer control. The printer control system comprises: the microcomputer 1 whose input/output interface circuit 13 includes a send/receive circuit (receive circuit or send/receive circuit) such as a universal serial bus; the buffer RAM (SDRAM) 28; character generation ROM (CGROM) 41; program ROM 43: and a print control circuit 45. These components are connected to a bus 47.

The address space of the microcomputer 1 is divided into predetermined sizes. The program ROM 43 is connected to area 0. The buffer RAM 28 is connected to area 1. The CGROM 41 is connected to area 2. The print control circuit 45 is connected to area 3. A necessary portion of the externally connected program ROM 43 is placed on the internal bus IBUS by storing it in the internal ROM 7, copying it to the internal RAM 9, or using internal cache memory. If the internal ROM 7 has a sufficient capacity, the program ROM 43 can be eliminated.

The system further comprises a print head 49, a linefeed motor 51, and a carriage return motor 53. The motors 51 and 53 are controlled by outputs from the timer included in the peripheral function circuit 15. Though not shown in the figure, the SCI included in the peripheral function circuit 15 is used for communication with a host. The A/D converter is used for supplying sensor information such as the number of sheets of paper, for example.

The microcomputer system in FIG. 8 allows the DMAC 5 to perform data transfer between the input/output interface circuit 13 such as a USB and the buffer RAM 28 without intermediation of the internal bus IBUS. The DMAC 5 can output print data and pulse signals to drive the linefeed motor 51 and the carriage return motor 52. Further, the DMAC 5 transfers data sent to or received from the SCI. In these case, data is transferred between the peripheral function circuit 15 and the internal RAM 9.

Improving the integration of semiconductor integrated circuits can integrate the print control circuit 45 and the like into the microcomputer formed of a single semiconductor integrated circuit. Moreover, general-purpose memories such as the buffer RAM 28 can be also integrated into the microcomputer formed of a single semiconductor integrated circuit. Memories such as the program ROM 43 and the CGROM 41 may vary with microcomputer systems depending on different printer models. It is preferable to use specific semiconductor integrated circuits to configure such memories. All that is important is not to change the logical bus configuration independently of which parts of the system should be integrated into a single semiconductor integrated circuit.

The above-mentioned embodiments of the invention provide the following effects.

(1) The bus for the microcomputer 1 is separated from the other buses to control them independently. The data transfer control in response to one data transfer request allows the DMAC 5 to request the bus access right in terms of the source and the destination independently. Operations such as reading programs from the memory 7 of the CPU 3 can be independent of the data transfer, i.e., at least one of read and write operations using the other buses of the DMAC 5. This can improve the microcomputer throughput.

(2) In response to one data transfer start request, the DMAC 5 requests the bus access right of one bus and the other bus, not using a sequence of requesting the bus access right in response to different data transfer requests for respective buses. It is possible to simplify a handshake sequence of a data transfer request and its acknowledgment and contribute to effective data processing by the DMAC 5 and the CPU 3.

(3) During a dual-address transfer, the DMAC 5 requests the bus access right for reading and writing independently based on one start request. Consequently, the bus access right arbitration can occur frequently. It is possible to shorten a wait from the time to request the bus access right to the time to release it. Also in this respect, the data processing performance can be improved.

(4) The bus controller 11 for the buses IBUS, PBUS, and EXBUS is provided with the bus control logic corresponding to the access address areas. This makes it possible to centrally control accesses from the CPU 3 and the other bus masters and to minimize an increase in the logical scale for the bus control.

(5) It is possible to concurrently execute programs on the CPU 3 using the internal bus IBUS and transfer data by the DMAC 5 using the peripheral bus PBUS and the external bus EXBUS, improving the data processing performance of the microcomputer 1. When the SDRAM is connected to the external bus EXBUS, the burst access can be applied easily. In other words, it becomes easy to allow the burst access to the SDRAM. Also in this respect, the data processing performance can be improved.

While there have been described specific preferred embodiments of the invention made by the inventors, it is to be distinctly understood that the present invention is not limited thereto but may be embodied in various modifications without departing from the spirit and scope of the invention.

For example, a data transfer device is not limited to the DMAC but may be a data transfer controller or a coprocessor requesting the bus access right. It is possible to appropriately change the DMAC transfer function and the register configuration. Transfer data may be sized in blocks as well as bytes, words, and long words. When a plurality of read and write operations is performed in response to one start request, it is just needed to request the bus access right for each read or write operation. The number of bits in the address register is not limited to 32 and may be changed in accordance with an address space for the CPU or the semiconductor integrated circuit device. For example, a 16-megabyte address space may use 24 bits. It is also possible to change the number of bits and the configuration of the transfer count register. Various modifications may be made to selections of transfer data sizes and start factors depending on data to be transferred, I/O devices and input/output interfaces functioning as transfer source and destination.

The microcomputer configuration is not limited to the above-mentioned embodiments either. The functional blocks can be modified variously. In addition to the DMAC, it may be preferable to include another data transfer device such as a data transfer controller connected to the first bus (I bus) or the second bus (P bus).

Various modifications may be also made to specific configurations such as those of the DMAC, the bus controller, the internal bus, and the external bus. There may be a plurality of peripheral buses or external buses. For example, it is possible to provide a plurality of second buses and to use one of them for direct connection between the input/output interface and the DMAC. The external bus is not limited to the interface between the semiconductor integrated circuit and the outside. While there has been described the use of clocks of the same operating frequency on the internal bus, the peripheral bus, and the external bus, divided clocks may be used appropriately.

The microcomputer system can be used for not only printers, but also digital communication systems, digital media interface systems, and the like. The microcomputer system further can be used for a system that receives data via the input/output interface, allows the DMAC to transfer the data to the buffer RAM via the DMAC, performs necessary processes such as demodulation, error correction, and modulation, and allows the DMAC to transfer the data to the input/output interface from the buffer RAM for transmission. In this case, the DMAC is used for a transfer from the input/output interface to the buffer RAM and a transfer from the buffer RAM to the input/output interface. This enables concurrent processing with the remaining data processing by the CPU, improving the data processing performance.

While there has been described the invention made by the inventors chiefly with respect to its application to the single-chip microcomputer as the background field, the present invention is not limited thereto. The present invention is also applicable to the other semiconductor integrated circuit devices such as those centered around a digital signal processor (DSP). The present invention can be applied to conditions capable of data transfer via at least two buses.

The following summarizes representative advantageous effects of the invention disclosed in this application concerned.

It is possible to independently request the bus access right and output addresses to different buses, making it possible to solve the state of competing for the bus access right among the buses. While the bus access right of one bus is granted for reading or writing, the bus access right of the other bus can be released. When the central processing unit is connected to any of buses, releasing the bus access right by the data transfer device enables data processing for the central processing unit.

In response to one data transfer start request, the bus access right is requested for one bus and the other bus, not using a sequence of requesting the bus access right in response to different data transfer requests for respective buses. It is possible to simplify a handshake sequence of a data transfer request and its acknowledgment and contribute to effective data processing by data transfer processing and the central processing unit.

Consequently, it is possible to improve the efficiency of data transfer processing and concurrent data processing by the central processing unit. That is to say, it is possible to perform processing mainly such as reading programs by the central processing unit concurrently with data transfer processing between various interface circuits and the buffer memory. In addition, it is possible to improve the efficiency of both processing to be made concurrent with each other.

What is claimed is:

1. A data processor formed on a semiconductor chip comprising:
   a first bus;
   a second bus;
   a third bus;
   a CPU connected to the first bus;
   a memory for storing a control program for the CPU and for coupling to the first bus;
   a data transfer controller for transferring data between the second bus and the third bus;
   a bus controller for controlling the first bus, the second bus, and the third bus; and
   an input/output circuit for coupling to the third bus,
   wherein the data transfer controller is operable to independently request a bus right and outputting an address to the second bus and the third bus,
   wherein the data transfer controller requests a bus right of one of the buses for reading data, accesses to the one bus according to the bus right and releases the bus right of one bus, and requests a bus right of the other bus for writing in response to one data transfer start request,
   wherein the bus controller is operable to arbitrate requests of the bus right and for bus controlling for the first bus, the second bus, and the third bus, independently, and
   wherein the data transfer controller transfers data between the input/output circuit connected to the third bus and an external memory connected to the second bus, during the CPU connected to the first bus access to the memory connected to the first bus.

2. The data processor according to claim 1, wherein the CPU accesses the second bus or the third bus from the first bus via the bus controller.

3. The data processor according to claim 1, wherein the data transfer controller includes a plurality of data transfer channels and a control register for specifying data transfer channel operations,
   wherein the control register includes a transfer request source specification area, a source bus specification area, and a destination bus specification area,
   wherein the transfer request source specification area is specified correspondence between the data transfer channel to receive a transfer request and a transfer request source,
   wherein the a source bus specification area is specified correspondence between the data transfer channel and a transfer source bus, and
   wherein the destination bus specification area is specified correspondence between the data transfer channel and a transfer destination bus.

4. The data processor according to claim 3, wherein the CPU accesses to the control register.

5. The data processor according to claim 1, wherein the bus controller is operable to allow a bus right of the third bus and a bus right of the second bus from the data transfer controller, during allowing a bus right of the first bus from the CPU.

* * * * *